United States Patent [19]
Steadman

[11] Patent Number: 6,013,895
[45] Date of Patent: Jan. 11, 2000

[54] SYSTEM AND METHOD FOR PERFORATING SHEET MATERIAL

[75] Inventor: Erich F. Steadman, Williamsville, N.Y.

[73] Assignee: Eastman Machine Company, Buffalo, N.Y.

[21] Appl. No.: 08/940,180

[22] Filed: Sep. 30, 1997

[51] Int. Cl.[7] .................................................. B23K 26/08
[52] U.S. Cl. ................................ 219/121.7; 219/121.71; 219/121.8; 219/121.82
[58] Field of Search ........................... 219/121.7, 121.71, 219/121.8, 121.82

[56] References Cited

U.S. PATENT DOCUMENTS

| | | | |
|---|---|---|---|
| 3,226,527 | 12/1965 | Harding | 219/121.7 |
| 3,543,979 | 12/1970 | Grove et al. | 219/121.72 |
| 4,446,187 | 5/1984 | Eklund | 428/136 |
| 4,743,123 | 5/1988 | Legters et al. | 219/121.7 X |
| 5,550,346 | 8/1996 | Andriash et al. | 219/121.7 X |

FOREIGN PATENT DOCUMENTS 3-128185  5/1991  Japan .

*Primary Examiner*—Gregory Mills
*Attorney, Agent, or Firm*—Hodgson, Russ, Andrews, Woods & Goodyear, LLP

[57] ABSTRACT

A method and apparatus for perforating sheet material wherein the resulting perforations are in a predetermined pattern which avoids imparting structural weakness to the perforated sheet material. The predetermined pattern includes spaced perforations along linear paths which are spaced along one linear dimension of the sheet material and each of which paths is disposed at an acute angle relative to another linear dimension of the sheet material. The predetermined pattern avoids straight paths of perforations along the longer linear dimension of the sheet material and thereby avoids imparting structural weakness to the material. Preferably the predetermined pattern is a series of herringbone patterns along the longitudinal dimension of the sheet with the rows of herringbone patterns and peaks thereof extending laterally of the sheet material. The pattern is formed by moving the sheet material in a first direction and scanning the material in a second direction with a pulsed laser beam. The perforated sheet material can be used as a conveyor belt in a vacuum/suction hold-down conveyor.

7 Claims, 10 Drawing Sheets

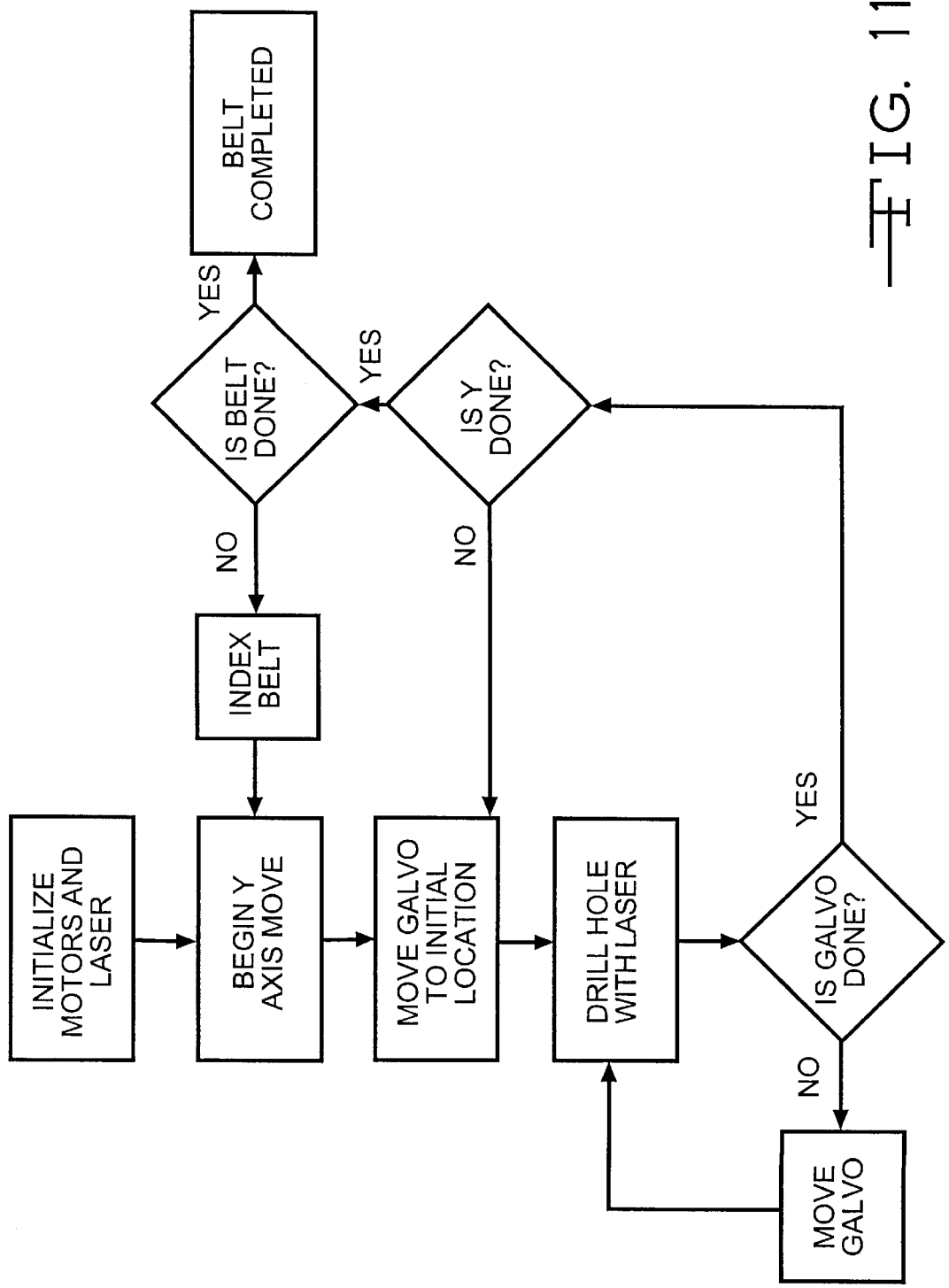

SYSTEM AND METHOD FOR PERFORATING SHEET MATERIAL

BACKGROUND OF THE INVENTION

This invention relates to the art of perforating sheet material, and more particularly to a new and improved method and apparatus for providing closely spaced small diameter holes in sheet material such as conveyor belts.

One area of use of the present invention is in microdrilling a series of closely spaced holes in a conveyor belt to a facilitate passage of air through the belt thus providing suction and vacuum hold-down of items such as sheet material carried on the conveyor belt. By way of illustration, such conveyor belts in vacuum hold-down apparatus used in the cloth cutting industry have very dense hole patterns, i.e. nearly a million small diameter closely spaced holes in a belt six feet wide and fifty feet long. In addition to the ability to provide even smaller diameter holes in closer spaced relation, an important consideration is providing the holes in a manner that does not impart structural weakness in the belt.

SUMMARY OF THE INVENTION

It would, therefore, be highly desirable to provide a new and improved system and method for perforating sheet material such as conveyor belts which provides relatively smaller diameter holes in closer spaced relation and yet which avoids imparting significant structural weakness to the perforated sheet material.

The present invention provides a method and apparatus for perforating sheet material wherein the resulting perforations are in a predetermined pattern which avoids imparting structural weakness to the perforated sheet material. The predetermined pattern includes spaced perforations along linear paths which are spaced along one linear dimension of the sheet material and each of which paths is disposed at an acute angle relative to another linear dimension of the sheet material. The predetermined pattern avoids straight paths of perforations along the longer linear dimension of the sheet material and thereby avoids imparting structural weakness to the material. Preferably the predetermined pattern is a series of herringbone patterns along the longitudinal dimension of the sheet with the rows of herringbone patterns and peaks thereof extending laterally of the sheet material. The pattern is formed by moving the sheet material in a first direction and scanning the material in a second direction with a pulsed laser beam.

BRIEF DESCRIPTION OF THE DRAWING FIGURES

FIG. 11 is a flow diagram illustrating operation of the apparatus of FIGS. 3–9.

DETAILED DESCRIPTION OF AN ILLUSTRATED EMBODIMENT

Figure 1:
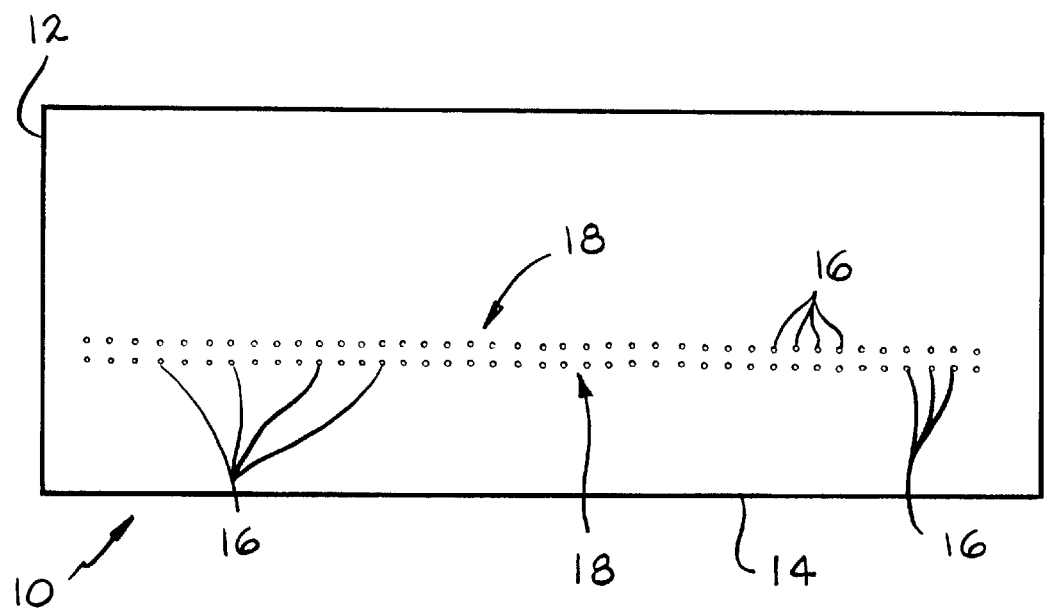
FIG. 1 is a diagrammatic view of a perforated conveyor belt according to the prior art.

FIG. 1 illustrates sheet material 10 such as that used for a conveyor belt and which is perforated in a manner according to the prior art. Such perforated conveyor belts are used in suction/vacuum hold-down apparatus for supporting sheet material and the like while it is being cut according to predetermined patterns, for example in the cutting of cloth in the garment industry. A typical conveyor belt material for such vacuum/suction hold-down apparatus will have a very dense hole pattern or arrangement, for example nearly a million small diameter holes in a belt six feet wide and fifty feet long. Belt 10 has a lateral edge 12 and a longitudinal edge 14, the longitudinal dimension being many times greater than the lateral dimension.

The holes or apertures 16 drilled or otherwise perforated through belt 10 are in a pattern including rows 18 which extend continually along belt 10 parallel to the longitudinal dimension of belt 10. This hole pattern of the prior art, particularly as the holes become more closely spaced in denser arrangements, can impart structural weakness to belt 10. In particular, such long rows 18 of closely spaced holes extending along the length of belt 10 can increase the probability of cracks or separations in the belt material as belt 10 encounters stresses during use.

Figure 2:
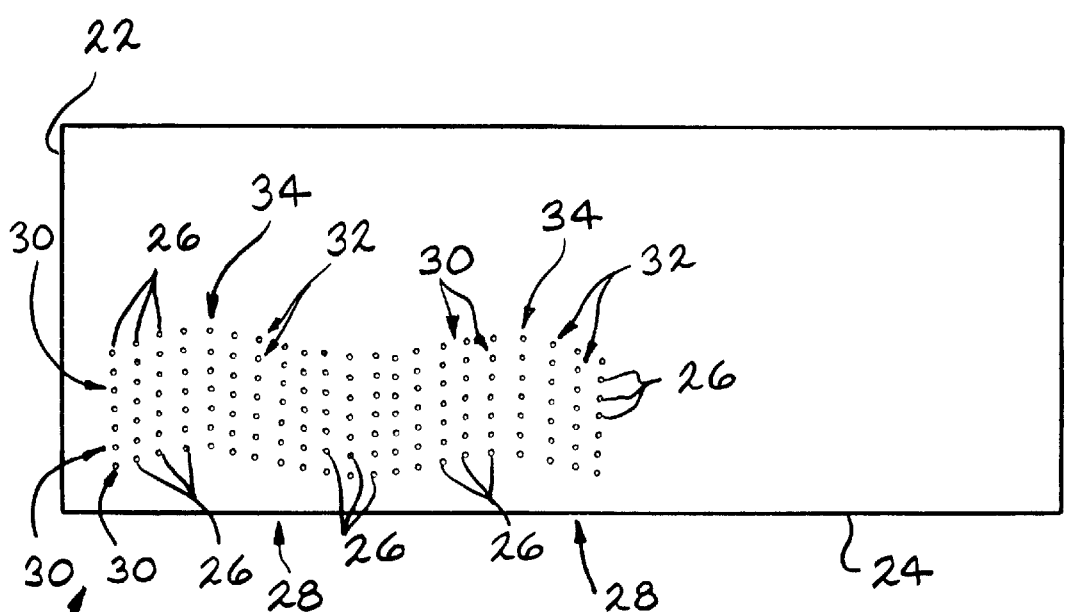
FIG. 2 is a diagrammatic view of a perforated conveyor belt according to the present invention.
Figure 3:
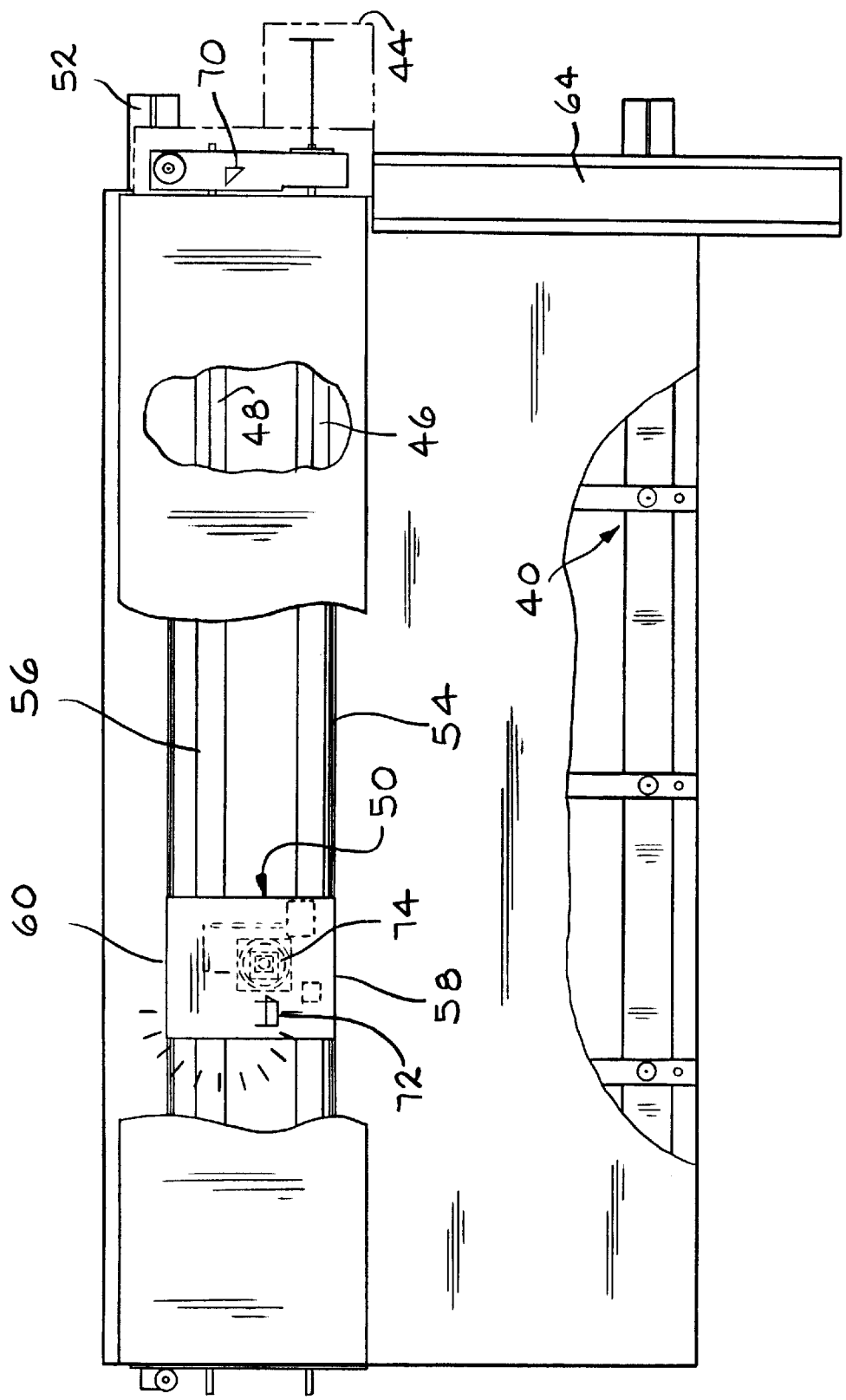
FIG. 3 is a top plan view of the apparatus according to the present invention for perforating sheet material.
Figure 4:
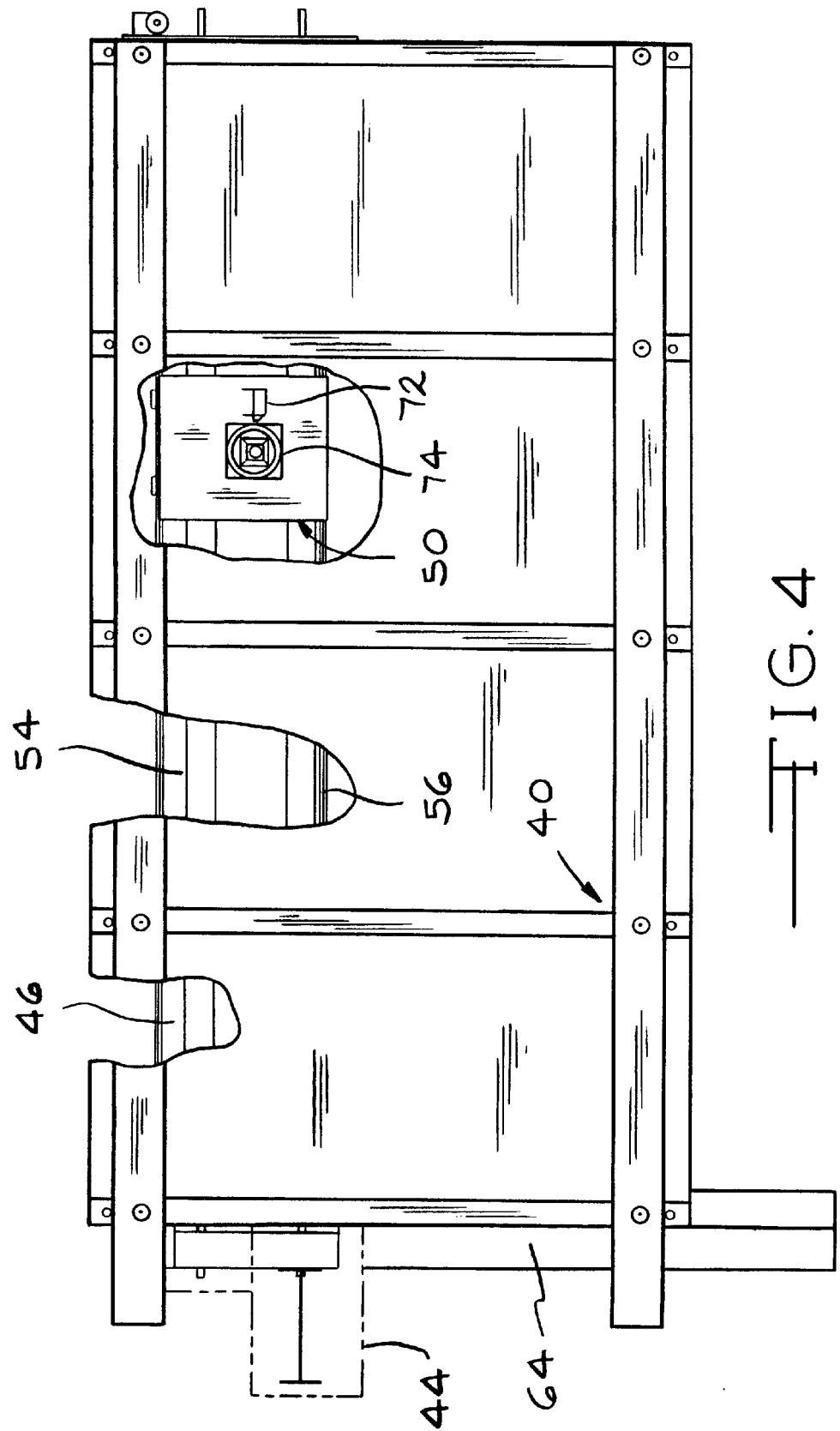
FIG. 4 is a bottom plan view thereof.
Figure 5:
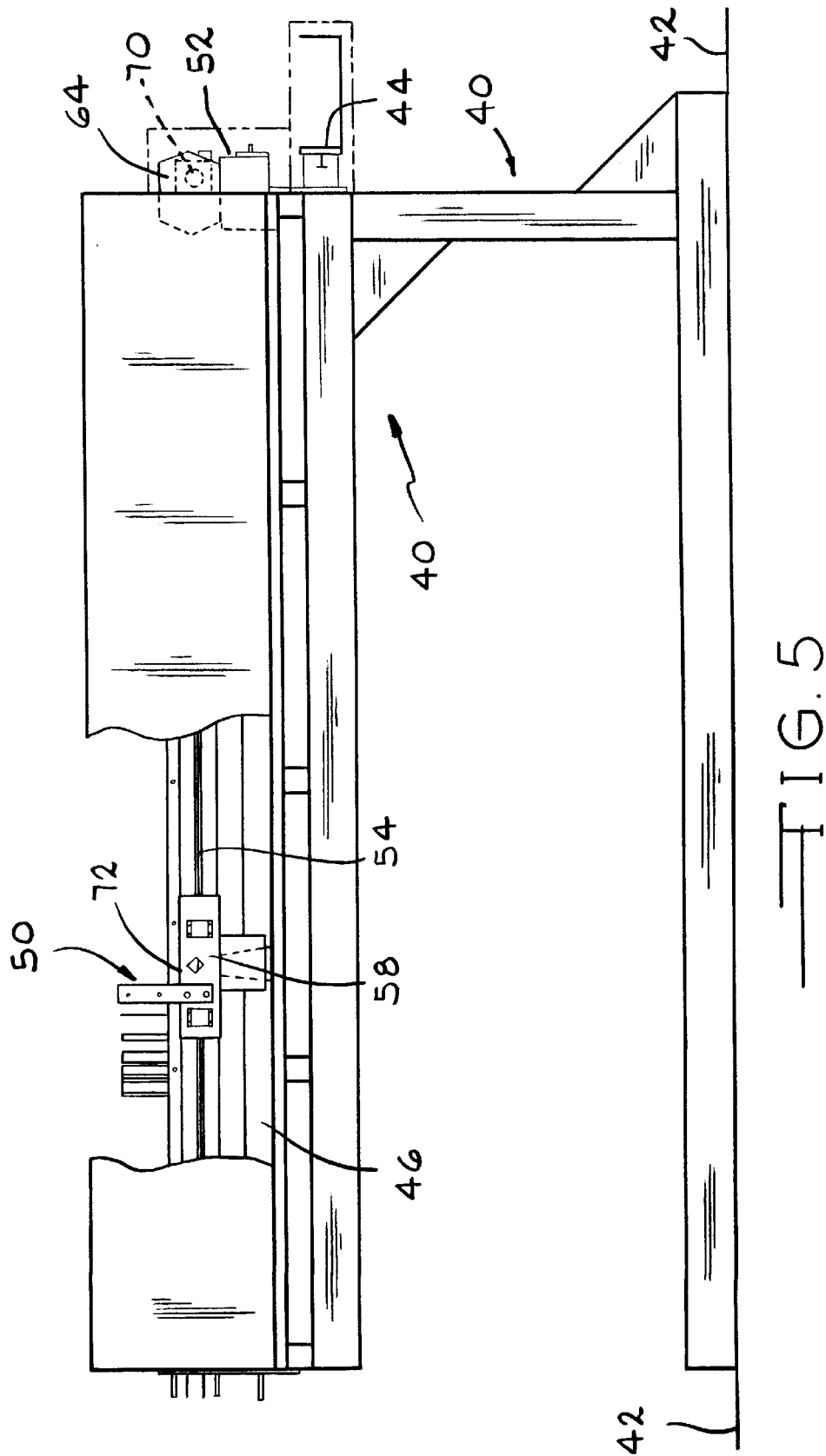
FIG. 5 is a front elevational view thereof.
Figure 6:
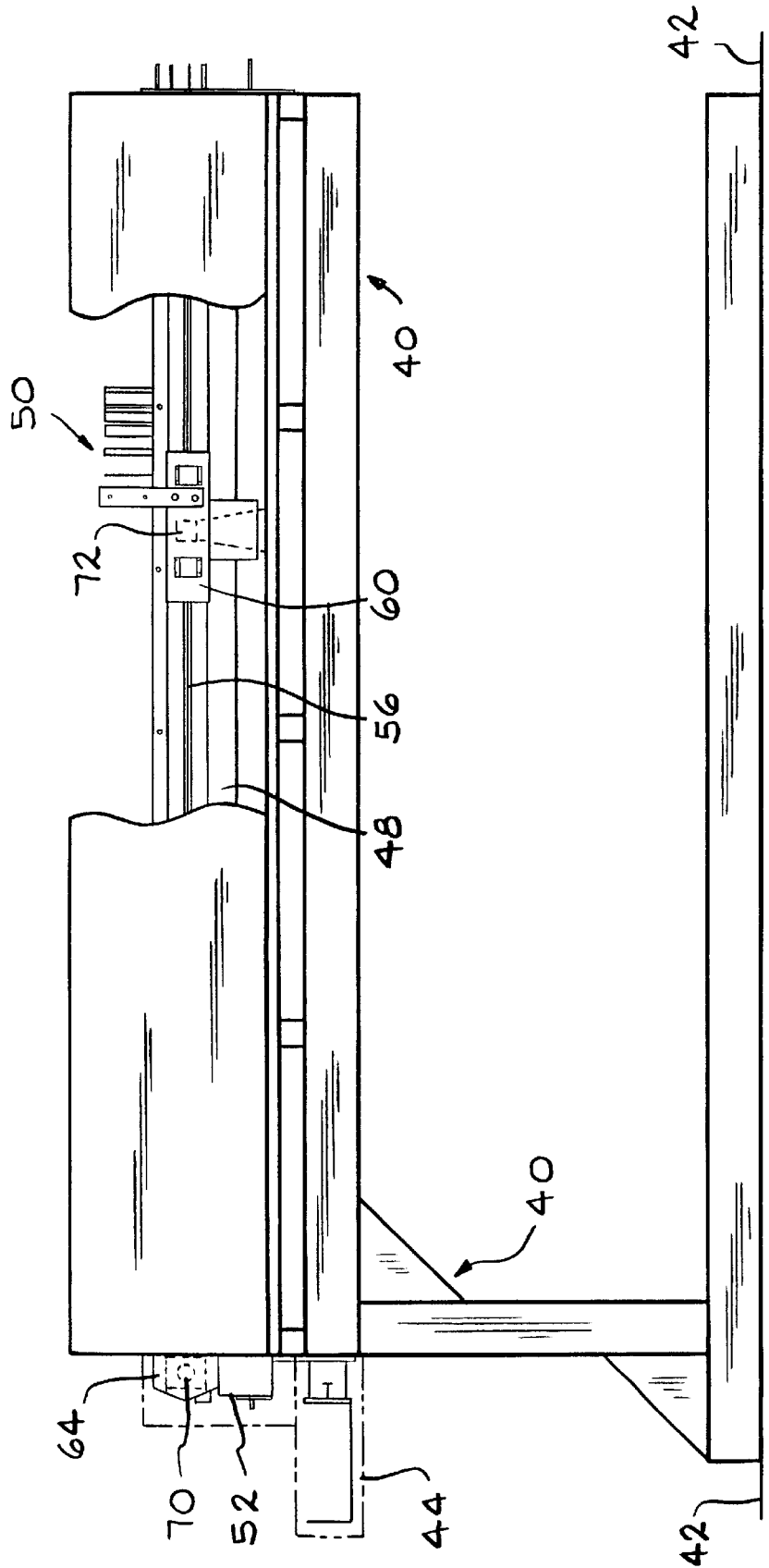
FIG. 6 is a rear elevational view thereof.
Figure 7:
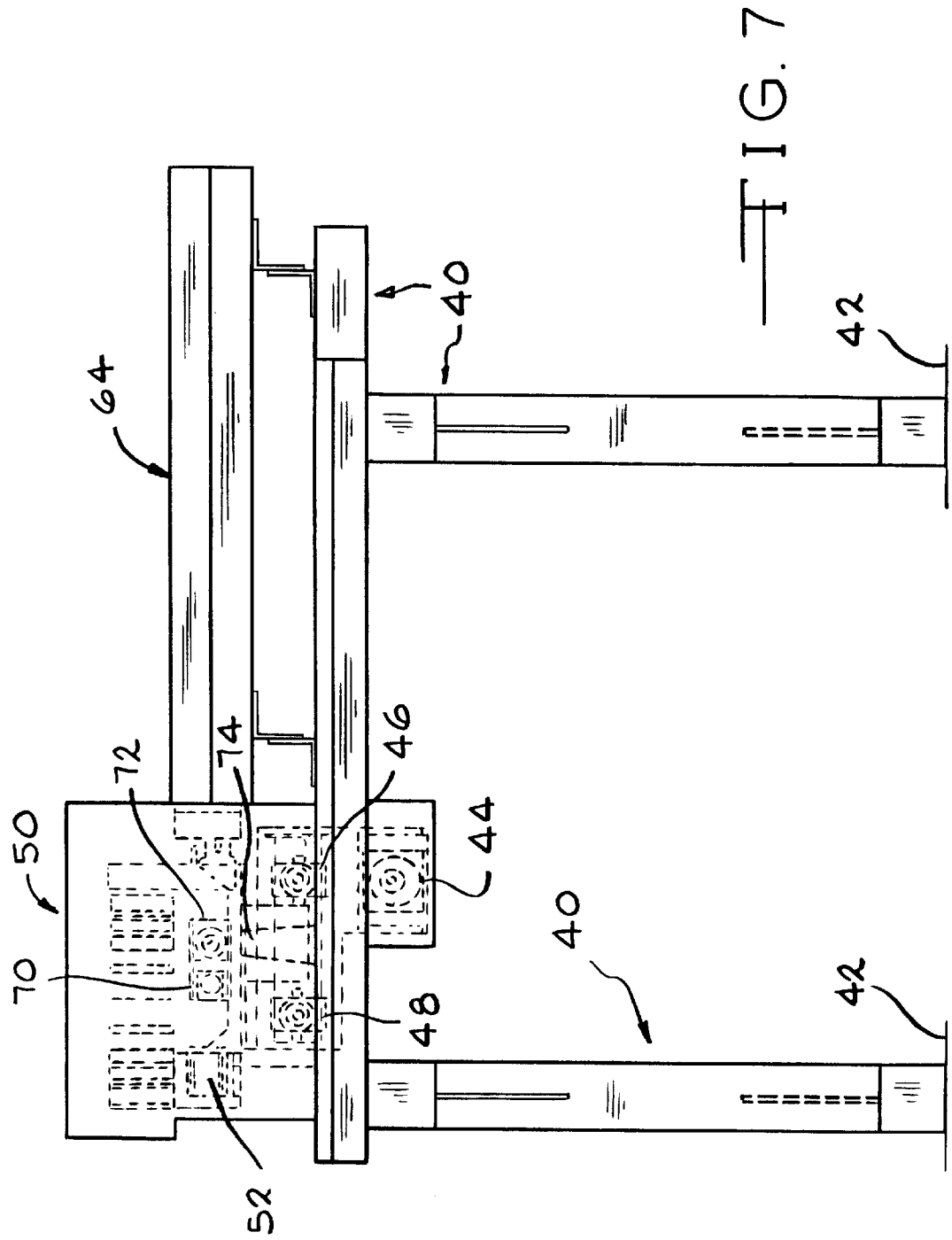
FIG. 7 is a left-hand end elevational view thereof.
Figure 8:
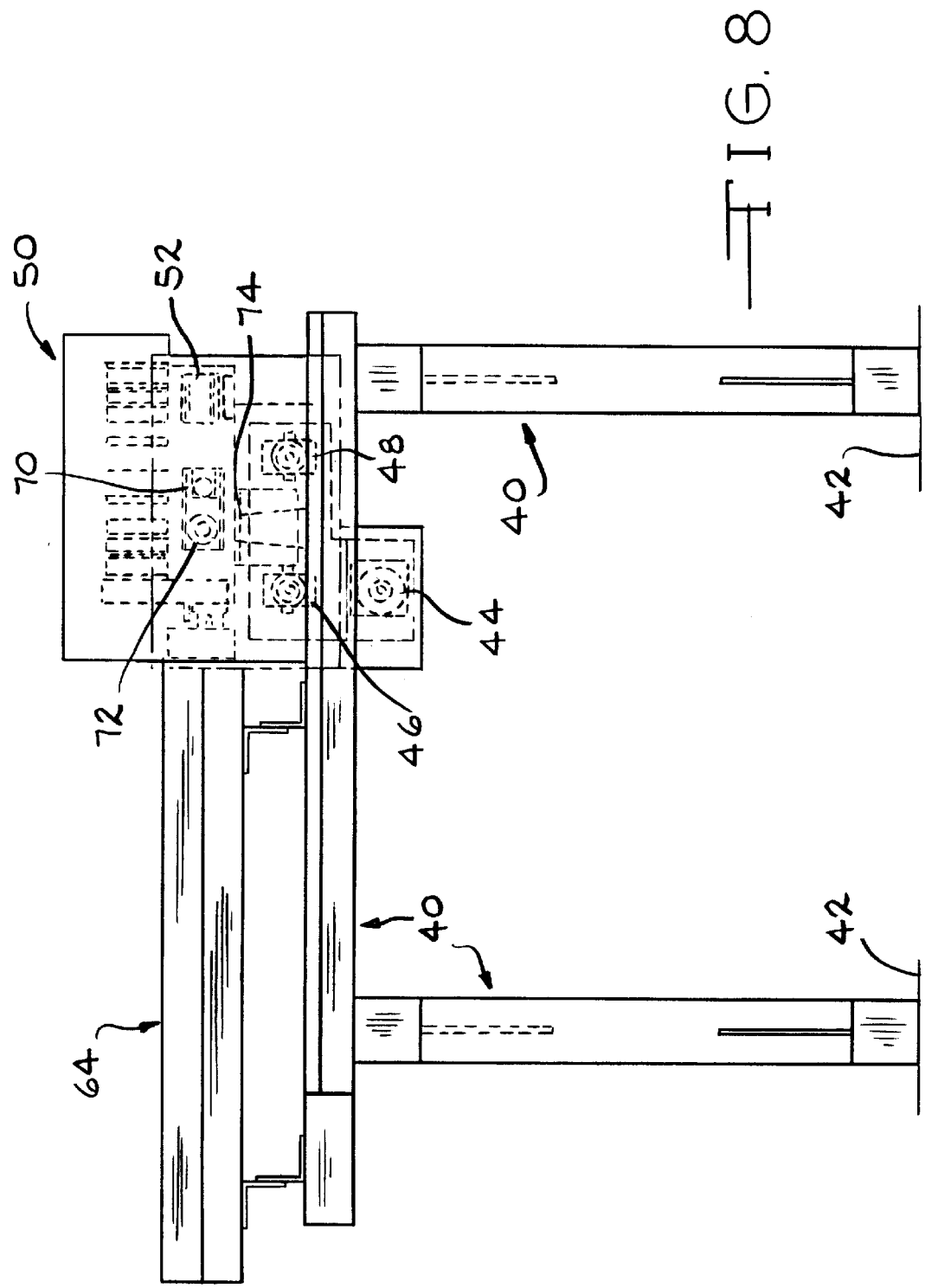
FIG. 8 is a right-hand end elevational view thereof.
Figure 9:
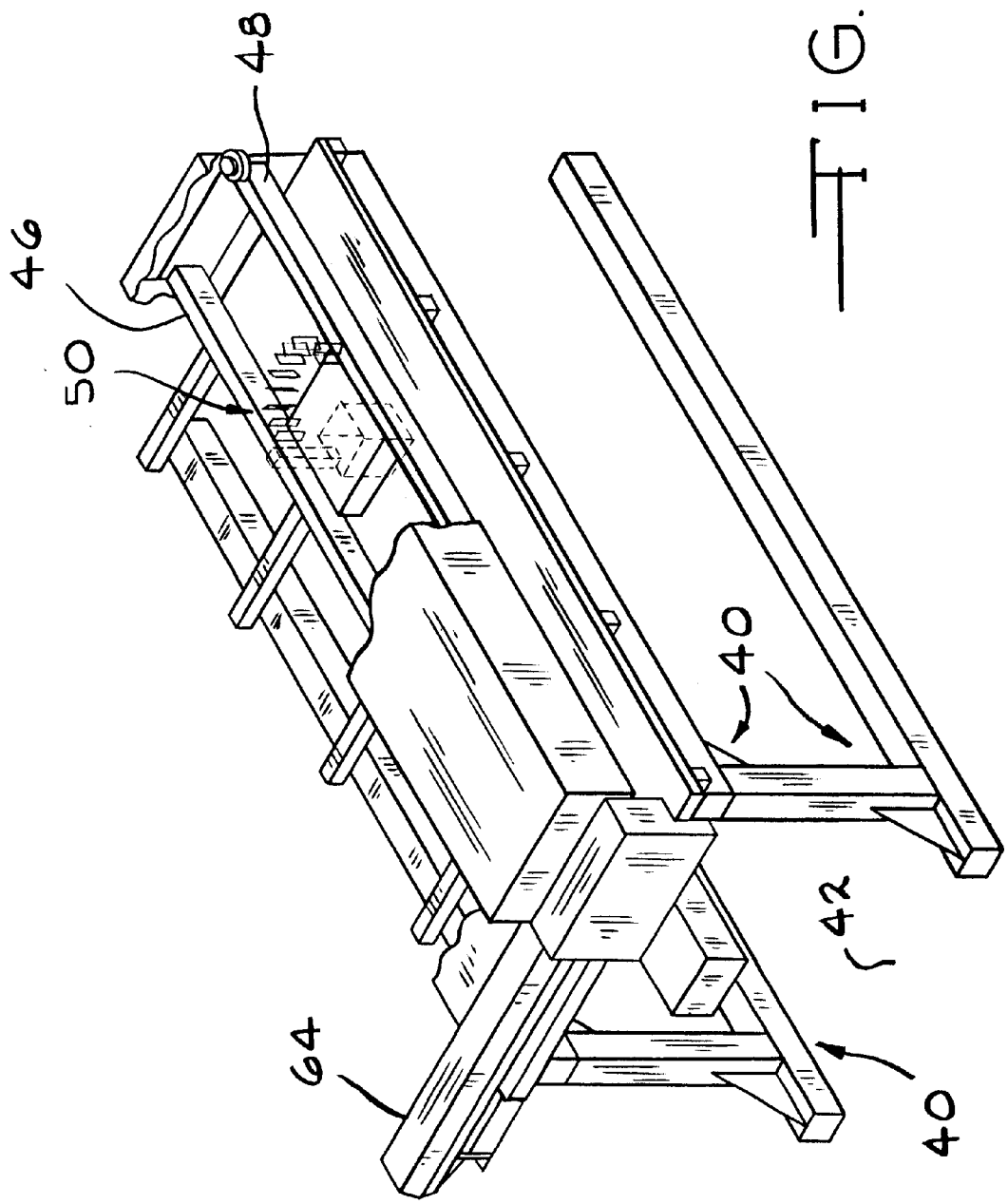
FIG. 9 is a perspective view thereof.
Figure 10:
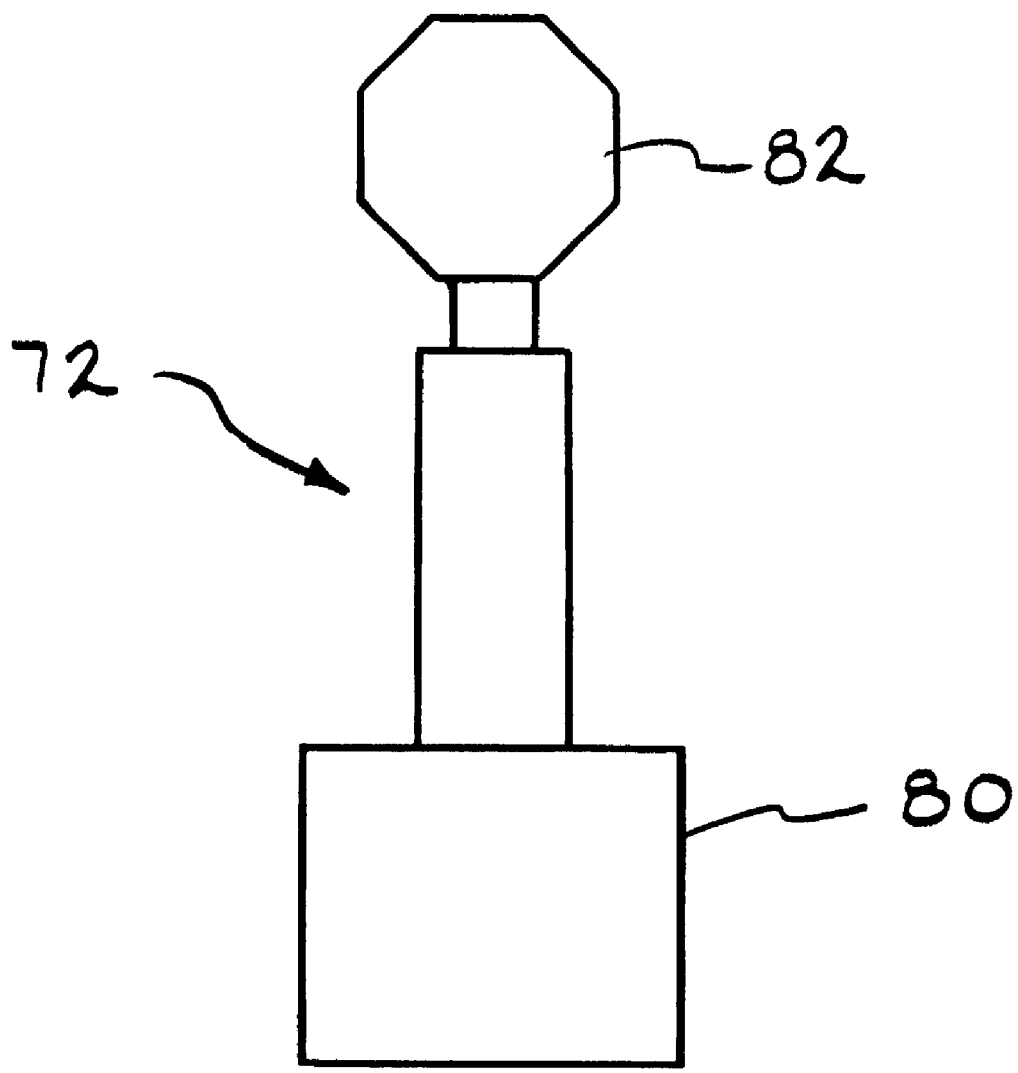
FIG. 10 is a diagrammatic view of the galvanometer-mirror combination in the apparatus of FIGS. 3–9.

FIG. 2 illustrates sheet material 20 such as that used for a conveyor belt and which is perforated in a predetermined pattern which avoids imparting structural weakness to the material of belt 20. Belt 20, like belt 10, finds use in the same vacuum/suction hold down apparatus, has a very dense arrangement of perforation or holes and has a lateral and longitudinal edges 22 and 24, respectively, with the longitudinal dimension of belt 20 being many times greater than the lateral dimension.

The holes or apertures 26 drilled or otherwise formed in belt 20 are in a pattern which avoids the prior art rows of closely spaced apertures extending continually along and parallel to the longitudinal dimension of the belt. Instead, perforations 26 are arranged in a herringbone pattern including a series of individual herringbone regions or groups 28 located serially along the length or longitudinal dimension of belt 20. Each group or region 28 has a dimension along the length of belt 20 which is significantly small in relation to the overall length of belt 20. Each herringbone region or group 28 extends across the entire lateral dimension or width of belt 20.

Each group or region 28 of the herringbone pattern of apertures 26 is formed by rows of apertures 26 each extending at an acute angle to the longitudinal dimension of belt 20. In particular, apertures 26 are arranged in a first series of spaced rows 30 where each row extends at an acute angle to belt edge 24 wherein the rows 30 are spaced apart along the lateral dimension or width of belt 20. Apertures 26 are arranged also in a second series of spaced apart rows 32 where each row also extends at an acute angle to belt edge 24 and wherein the rows 32 also are spaced apart along the lateral dimension of belt 20. The first and second series of rows 30 and 32 meet in peaks 34 thereby defining the herringbone pattern wherein the peaks 34 are located in a row extending laterally of belt 20. The foregoing pattern or arrangement is repeated for each of the groups or regions 28.

By way of example, an illustrative belt 20 is a composite material of PVC and urethane with a polyester substrate, holes 26 have a diameter in the range 0.015 inch to 0.030 inch, and holes 26 are spaced apart 3–5 mm to provide a very dense hole pattern of about 1.7 million holes over a six foot by fifty two foot belt. The dimension of each herringbone group or region 28 parallel to the length of belt 20 is about 4–6 inches, the distance from the edge of the region to the mid-point in registry with the peaks therefore being one-half the foregoing dimension, i.e. 2–3 inches.

The method of the present invention in perforating belt 20 in the foregoing herringbone pattern of apertures can be carried out by apparatus as shown in FIGS. 3–10. The apparatus comprises a frame 40 adapted to rest on a supporting surface 42 such as the floor of a factory. There is provided means on frame 40 for moving sheet material to be perforated in a first direction. The means for moving comprises a motor 44 and rollers 46, 48. The direction in which the sheet material is moved is also referred to the X direction or X axis and motor 44 is the X motor.

The apparatus further comprises a scanner assembly generally designated 50 movably mounted on frame 40 and means 52 for moving scanner assembly 50 along frame 40 in a second or Y direction. Thus, scanner assembly 50 also is referred to as the Y carriage and means 52 is the Y motor. In the apparatus shown, the Y axis or direction is perpendicular to the X axis or direction. Scanner assembly 50 travels along frame 40 over rails 54, 56 extending in the Y direction, the assembly 50 including blocks 58 and 60 which engage rails 54 and 56, respectively.

There is a provided laser means 64 supported by frame 40 for directing a pulsed laser beam to scanner assembly 50. Laser means 64 is in the form of a laser tube fixed to one end of frame 40. A mirror 70 directs the laser beams to scanner assembly 50. Scanning means on scanner assembly 50 receives the pulse laser beam and directs the beam into the material for perforating the same. The scanning means includes a galvomotor-mirror combination 72 and a lens 74.

In operation, sheet material to be perforated, such as belt 20, is loaded underneath the X rollers 46, 48. The control software enables the X and Y motors 44 and 52, respectively, and also enables the laser 64 and sets its power to the tickle level so that the laser 64 is ready to output power. The material, i.e. conveyor belt 20, is perforated across the width of the belt, i.e. in the Y direction, in a series of bands 2–3 inches wide. Each band corresponds to one-half of each of the herringbone groups 28 in FIG. 2. The Y carriage 50 moves continuously across the material, i.e. belt 20, which the laser 64 pulses. In coordination with the laser pulsing, the galvo-mirror 72 is indexed, i.e. stepped, to create a row of holes or perforation like rows 30 shown in FIG. 2 the row of holes created is diagonal, i.e. at an acute angle to the X axis, because of the continuous movement of Y carriage 50. When an entire row has been perforated, i.e. one-half of a herringbone pattern group, the X axis motor 44 is advanced the width of a row, i.e. 2–3 inches, to start the next row.

In particular, the foregoing operation is begun with Y carriage at a home position, typically at the end of frame 40 near the location of laser tube 64.

The Y carriage 50 is commanded by the system motion control to move slowly from its home location to the opposite side of the machine using functionality provided by the motion control 76. Once this motion is started, the motion control handles all processing to keep the motion going so that the software running on the PC is free to do other tasks, i.e. this motion occurs in the background while the galvo motor 72 is commanded to move. The software switches the laser 64 to its high power setting for the period of time the operator has determined will result in the desired perforation of the belt. Typically this is about 25 to 50 milliseconds. With the laser 64 back in tickle mode, the galvo motor 72 is commanded to move to its next location. After a brief pause of about 5 milliseconds the laser 64 is fired again and this is repeated until the galvo 72 has moved through its range of motion. The galvo 72 is then reset back to its original location to begin another pass. This is repeated until the Y axis is done with its motion. The X axis is then indexed by the width of the perforations made in the previous pass. This process continues with the Y carriage 50 moving back towards the home location. This is then repeated until the entire belt is perforated.

The foregoing is illustrated in the flow diagram of FIG. 11. By way of example, in an illustrative apparatus and method, laser 64 is a 100 watt $CO_2$ laser, the motion control 76 is provided by a motion control board commercially available from Motion Engineering, Inc. the galvomotor mirror combination, also shown diagrammatically in FIG. 10, includes a galvanometer 80 and mirror 82 and is commercially available from General Scanning, Inc. under the designation M3 Series Optical Scanner. Mirror 82 is stepped or indexed about the axis of the output shaft of motor 80. The method and apparatus of the present invention can be used to perforate various materials, and one illustrative conveyor belt material is 2 mm thick PVC or urethane bonded to a 2 mm thick woven polyester belt. The density of the grid pattern of holes can be carried from a 1 mm grid to a 5 mm grid. The hole diameters can be in the range from about 0.015 inch to 0.030 inch and the distance between holes can be in the range of 3–5 mm. An example of a conveyor in which a perforated belt according to the present invention finds use is shown and described in United States patent application entitled "Continuous System and Method For Cutting Sheet Material" filed Sep. 30, 1997 under Express Mail No. EI485212260US.

It is therefore apparent that the present invention accomplishes its intended objectives. While an embodiment of the present invention has been described in detail, that is for the purpose of illustration, not limitation.

What is claimed is:

1. Apparatus for perforating sheet material comprising:

a) a frame;

b) means on said frame for moving sheet material to be perforated in a first direction;

c) a scanner assembly movably mounted on said frame;

d) means for moving said scanner assembly along said frame in a second direction;

e) laser means supported by said frame for directing a pulsed laser beam to said scanner assembly;

f) scanning means on said scanner assembly for receiving said pulsed laser beam and for directing said pulsed laser beam onto said sheet material during movement of said sheet material and said scanner assembly for perforating said sheet material in a manner forming a predetermined pattern of closely spaced perforations which pattern is selected so as to avoid imparting structural weakness to the perforated sheet material;

g) said sheet material having first and second dimensions corresponding to said first and second directions and said first dimension being many times longer than said second dimension; and h) said scanning means being operatively associated with control means for causing said perforations to be arranged in a series of linear paths spaced in said second direction and each extending at an acute angle to said first direction so as to avoid straight paths of perforations along the first dimension of said sheet material and thereby avoid imparting structural weakness to said sheet material.

2. Apparatus according to claim 1, wherein said first and second directions are perpendicular to each other.

3. Apparatus according to claim 1, wherein said scanning means is operatively associated with said control means for causing said perforations to be arranged in a herringbone pattern wherein the peaks of the pattern extend along the shorter dimension of the sheet material.

4. A method of perforating sheet material comprising the steps of:
   a. moving the sheet material in a first direction;
   b. scanning the sheet material in a second direction with a pulsed laser beam;
   c. said sheet material being elongated wherein a first linear dimension is the width of the material and a second linear dimension is the length of the material and is many times greater than the width thereof; and
   d. controlling the scanning to provide a predetermined pattern of closely spaced perforations which pattern is selected so as to avoid imparting structural weakness to the perforated sheet material, the predetermined pattern including spaced perforations along linear paths which are spaced alone said first linear dimension of the sheet material and each of said paths being disposed at an acute relative to said second linear dimension of the sheet material so as to avoid straight paths of perforations along said second linear dimension of the sheet material and thereby avoid imparting structural weakness to said sheet material.

5. The method according to claim 4, wherein said predetermined pattern is in the form of a herringbone pattern with the peaks thereof extending laterally of the sheet material which has a longitudinal dimension many times greater than the length thereof.

6. The method according to claim 4, wherein said predetermined pattern is a series of herringbone patterns along the longitudinal dimension of the sheet material with the peaks of the herringbone patterns extending along the lateral dimension of the sheet material, the longitudinal dimension being many times greater than the lateral dimension.

7. The method according to claim 4, wherein the sheet material is for use as a conveyor belt.

\* \* \* \* \*